United States Patent [19]

Fish et al.

[11] 3,927,264

[45] Dec. 16, 1975

[54] DIAL PULSE DETECTOR AND METHOD

[76] Inventors: Leonard A. Fish, 21 W. Goethe, Chicago, Ill. 60601; Harvey A. Brodsky, 9440 Lincolnwood Drive, Evanston, Ill. 60203; Bruce A. Weitzel, 8315 Rte. 53, Woodridge, Ill. 60515

[22] Filed: Aug. 17, 1973

[21] Appl. No.: 389,340

[52] U.S. Cl. .................................. 179/2 A; 179/6 E

[51] Int. Cl.² .................. H04M 11/06; H04M 11/10

[58] Field of Search ..... 179/2 DP, 2 A, 6 E, 18 DA, 179/90 D, 16 E, 16 EA, 16 EC; 328/108, 119; 340/359

[56] References Cited

UNITED STATES PATENTS

| | | | |
|---|---|---|---|
| 2,811,585 | 10/1957 | Coen | 179/6 E |
| 2,993,960 | 7/1961 | Anderson | 179/6 E |
| 3,219,762 | 11/1965 | Abbott | 179/6 E |
| 3,444,324 | 5/1969 | Dougan | 179/2 DP |

*Primary Examiner*—Kathleen H. Claffy
*Assistant Examiner*—Thomas D'Amico
*Attorney, Agent, or Firm*—Hill, Gross, Simpson, Van Santen, Steadman, Chiara & Simpson

[57] ABSTRACT

A dial pulse detector and decoder, adapted for use with a remote control device by which electrical apparatus may be controlled by control signals furnished over telephone transmission lines, incorporates apparatus for selectively establishing a threshold level, based upon the highest amplitude of a pulse train received during a preliminary set-up period. A predetermined code is decoded by the apparatus during the set-up period to insure that set-up is accomplished by control pulses rather than by noise pulses. Subsequently, control pulses received over the telephone transmission line are operative to produce control signals, in accordance with the number of pulses received in each pulse train over the telephone transmission line. Apparatus is provided for detecting pulses originated by dial-type telephone instruments by means of the duration of the pulses produced thereby and the time interval between successive pulses, and such apparatus is insensitive to the waveshape of such pulses. The system is also insensitive to voice signals and to signals produced by Touch Tone type telephone instruments.

23 Claims, 1 Drawing Figure

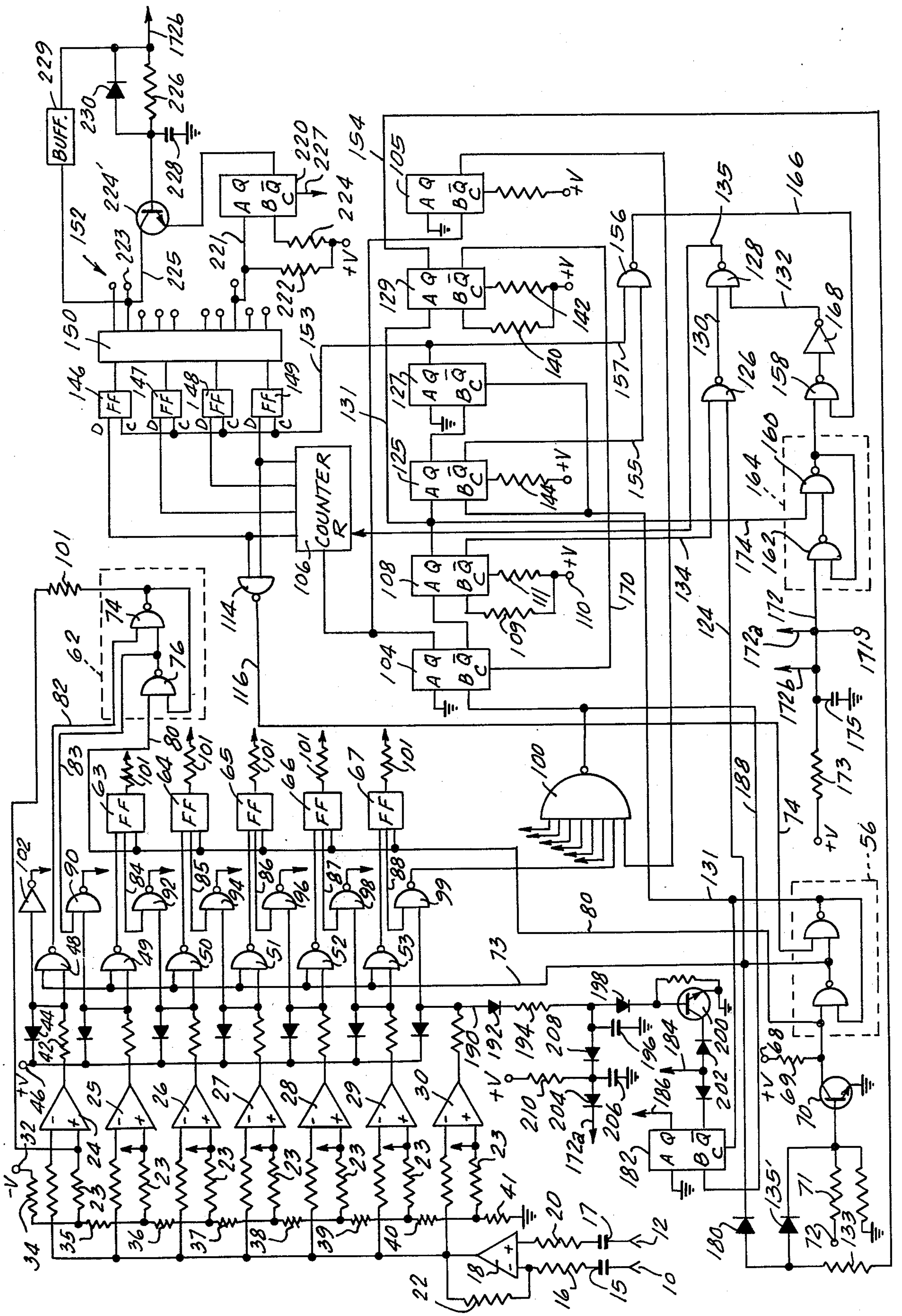

DIAL PULSE DETECTOR AND METHOD

BACKGROUND

1. Field of the Invention

The present invention relates to apparatus for detecting and decoding dial pulses originated with dial-type telephone instruments, in order to produce control signals for controlling the operation of an electrically operated remote control device.

2. The Prior Art

It is frequently desirable to remotely control apparatus, such as a dictating machine or the like, using ordinary telephone lines and controlling signals originated by operation of a telephone instrument. In the past, for the most part, this has required the use of a so-called Touch Tone-type telephone instrument which produces signals having unique combinations of frequencies generated to represent the digits of the decimal system. They may readily be distinguished from each other at the remote location by using a number of bandpass filters or the like. However, if it is desired to control the apparatus remotely by the use of dial-type telephone instruments as well as Touch Tone-type instruments, apparatus must be provided at the remote location which is able to recognize and interpret the pulses generated by a dial-type instrument.

The pulses generated by a dial-type telephone instrument consist of breaks in the current of a d.c. line, the d.c. line being that connecting the telephone instrument to a central telephone office or the like. While the dial pulses may be readily detected at the site of the central office by means by counting the current breaks, other locations are not connected by means of a d.c. line with the calling instrument, but rather by means of an a.c. line connected through a number of repeater amplifiers or the like. Thus, the interruption of d.c. current by the dial-type instrument, which produces approximately rectangular pulses at the central telephone office, produces an entirely different type of signal at a remote location, such as the location of a called telephone instrument. At the remote location, the pulses generated by a dial-type instrument resemble packets or bursts, rather than rectangular d.c. pulses. Moreover, the amplitude of such packets or bursts is extremely variable, depending upon the length of the transmission line over which the pulses are carried from the originating instrument to the remote location, the number of repeater amplifiers in the transmission line, etc.

Another problem involved in the recognition of pulses originating with a dial-type telephone instrument is the presence of noise pulses on the line. The noise pulses may originate as a result of cross-talk with other transmission lines or from a variety of other sources. The amplitude of the noise pulses and their spacing are variable. Frequently, the noise pulses on one line are greater in amplitude than the legitimate pulses on some other transmission line. It has not, therefore, been possible to set a threshold limit below which all pulses may be rejected as insignificant noise. Whatever level may be chosen for such a threshold, some noise pulses will be found to exceed the threshold level, and some legitimate pulses will fall below the threshold level. Accordingly, it has heretofore been thought to be impracticable to use a dial-type telephone instrument as a source of pulses for remote control operations.

Accordingly, the only way in which a dial-type instrument could heretofore be used to control remote control equipment is through the use of a portable oscillator, carried by the operator, and used to operate the remote control device through a filter adapted to detect the frequency of the oscillator, and responsive thereto when the audio output of such oscillator is held up to the microphone of a telephone handset. Operation of the dial then serves to break the audio tone of the oscillator into a series of pulses which are detectable by apparatus at the remote location. Of course, this system has proved extremely cumbersome and impractical, requiring the use of special equipment at both ends of the transmission line, rather than one single stationary unit.

SUMMARY OF THE INVENTION

It is therefore, a principal object of the present invention to provide apparatus and a method whereby a dial telephone instrument may be used as a source of pulses for controlling a remote control device, without requiring any additional equipment at the site of the instrument.

A more specific object of the present invention is to provide a dial pulse detector which is not sensitive to the shape of received pulses but is sensitive to their pulse repetition rate.

Another object of the present invention is to provide a system for selecting a threshold level, above which pulses are recognized as originating with a dial-type handset, and below which pulses are rejected as noise.

A further object of the present invention is to provide a dial pulse detector which is not affected by Touch Tone signals or by voice signals which may be present on the transmission line with which the detector is connected.

A further object of the present invention is to provide a system for establishing a threshold amplitude for the recognition of dial pulses which is responsive to the maximum amplitude portion of a train of pulses received during a preliminary phase of operation.

These and other objects of the present invention will become manifest by an examination of the following description and the accompanying drawings.

In one aspect of the present invention, it is recognized that, although the amplitude of the legitimate dial pulse signals and noise pulses varies considerably from case to case depending upon the length of the transmission line, the number of repeater amplifiers, and the like, nevertheless, once a particular connection is established over a transmission line, the amplitude of the legitimate dial pulses tends to be relatively constant, and this constant amplitude is higher than virtually all the noise pulses on the line. Accordingly, a discriminator with a variable threshold level can be used to determine the amplitude of the dial pulses arriving on the line, and subsequently set a threshold level to remain in effect for the entire communication over that transmission line hookup. The threshold level so selected is sufficiently high to eliminate the noise pulses, but low enough to pass all of the legitimate dial pulses.

In one embodiment of the present invention, there is provided a plurality of gates connected to a transmission line and each having a predetermined threshold level, such that each of the gates has a different threshold level. A plurality of flip-flops is associated with the gates to permit all of the gates initially to transmit pulses to a counter, provided that the pulses have a pulse length and pulse spacing betwen predetermined limits. After the counter has recognized the occurrence of nine successive pulses, it disables all of the gates except the one gate with the highest threshold, which is, nevertheless, low enough to pass the pulses. Subsequently, only that one gate is permitted to transmit pulses from the transmission line to the decoder, by which the pulses in each train pulses originating with a dial telephone handset is passed to a counter and matrix decoder for decoding.

BRIEF DESCRIPTION OF THE DRAWINGS

Reference will now be made to the accompanying drawing which is functional block diagram partly in schematic circuit diagram form, a dial pulse detector incorporating an illustrative embodiment of the present invention.

PREFERRED EMBODIMENT

Connection is made from the telephone transmission line to the apparatus of the present invention through the terminals 10 and 12. The terminals 10 and 12 are preferably connected to the transmission line through a network including a hydrid circuit (not shown) such as that shown in the copending Fish et al. application, Ser. No. 389,341, filed contemporaneously herewith, entitled, "Dictating Machine Control Unit and Method," the disclosure of which is hereby incorporated by reference into this application. The copending Fish et al. application discloses a remote control unit, especially suitable for controlling a dictating machine, and a Touch Tone decoder, especially suitable for cooperation with the dial pulse detector disclosed herein for controlling such dictating machine. The terminal 10 is connected through a capacitor 15 and a resistor 16 to the inverting input of a differential amplifier 18. The terminal 12 is connected through a capacitor 17 and a resistor 20 to the noninverting input of the amplifier 18. A resistor 22 is connected between the output of the amplifier 18 and its inverting input to provide a feedback for controlling the gain of the amplifier 18 and for providing constant amplification over the entire passband of the transmission line.

The output of the amplifier 18 is connected through individual coupling resistors to the inverting input of each of a series of differential amplifiers 24–30. The other input of the differential amplifiers 24–30 is derived from a voltage divider network connected between a terminal 32 and ground. The terminal 32 is connected to a source of negative potential, and a series of eight resistors 34–41 is connected in series from the terminal 32 to ground. A different one of the amplifiers 24–30 is connected through an individual coupling resistor 23 to the junction between each adjacent pair of the resistors 34–41. Thus, the amplifier 24 has its noninverting input connected to the junction between the resistors 34 and 35, the amplifier 25 has its noninverting input connected to the junction between the resistors 35 and 36, etc. The voltage divider network establishes a different bias for each of the amplifiers 24–30 and sets a different threshold level for each.

As long as no pulses arrive on the transmission line connected to the terminals 10 and 12, each of the amplifiers 24–30 provides a low level potential at its output terminal. Each amplifier has its output connected through a resistor and a diode to a positive potential at a terminal 46, to clamp the anode of each diode at the clamping voltage level whenever the output of its respective amplifier goes high. Thus, the output of the amplifier 24 is connected through a resistor 42 and a series connected diode 44 to the terminal 46, to which the clamping voltage is connected. Whenever the output of the amplifier 24 exceeds the level of the potential at the terminal 46, the anode of the diode 44 is clamped to that level. The clamping network associated with the other amplifiers 25–30 is identical to that which has been described in connection with the amplifier 24.

A series of six NAND gates, 48–53, are connected to receive the outputs of the amplifiers 24–29, each of the gates having an input connected to the output of an individual one of the amplifiers 24–29 through its individual clamping resistor. The second inputs of the gates 48–53 are all connected in common to an output of an RS flip-flop 56, which output, during the initial phase of operation, manifests a relatively high potential. As long as the outputs of the amplifiers 24–30 remain low, each of the gates 48–53 exhibits as an output a high level signal. When the output of any of the amplifiers 24–30 goes high, however, the output of its respective gate goes low.

The output of the gate 48 is connected to one input of an RS flip-flop 62 over a line 82. Similarly, the output of the gate 49 is connected to one input of an RS flip-flop 63; the output of the gate 50 is connected to one input of an RS flip-flop 64; the output of the gate 51 is connected to one input of an RS flip-flop 65; the output of the gate 52 is connected to one input of an RS flip-flop 66; and the outut of the gate 53 is connected to one input of an RS flip-flop 67. All of the flip-flops 62–67 are constructed in a manner illustrated for the flip-flop 62, and incorporate a pair of cross-coupled NAND gates 74 and 76.

Such a flip-flop remains in either of its stable states as long as the input to the gate 74 on the line 82 is maintained at a high level. The flip-flop 62 is reset to the state in which the output of the NAND gat 76 is high by causing the input to that gate over the line 80 to go low. Similarly, the flip-flop 62 can be set into the state in which the output of the gate 76 is low by causing the input to the gate 74 over the line 82 to go low. As has already been described, the line 82, connected to the output of the gate 48, is high during the initial phase of operation as long as no signal is presented at the output of the amplifier 24, and the line 80 is also maintained at a high level at this time, but had been low momentarily as a result of the operation of apparatus described hereinafter. Accordingly, during the initial phase of operation, the output from the flip-flop 62 on the line 83 is high, as are the corresponding outputs from all of the other flip-flops 63–67.

The output line 83 from the flip-flop 62 is connected to one input of a NAND gate 90, the other input of which is connected to the output of the amplifier 25 through its clamping network. The output 84 of the flip-flop 63 is connected to one input of a NAND gate 92, the other input of which is connected to the output of the amplifier 26 through its clamping network. In identical fashion, the gate 94 is connected with the flip-flop 64 and the amplifier 27; the gate 96 is connected with the flip-flop 65 and the amplifier 28; the gate 98 is connected with the flip-flop 66 and the amplifier 29; and the gate 99 is connected with the flip-flop 67 and the amplifier 30. The outputs of the gates 90-99 are connected to separate inputs of a NAND gate 100. One additional input of the NAND gate 100 is connected to the output of an inverter 102, the input of which is connected to the output of the amplifier 24 through its clamping network.

During the initial phase of operation of the illustrated apparatus, the outputs from the various flip-flops are high but the outputs of the amplifiers 24–30 are low, and so the outputs of the gates 90-99 all produce high level signals. As the output of the amplifier 24 is low, the inverter 22 also produces a high level signal, so that all of the inputs to the NAND gate 100 are high, and a low level signal is accordingly produced at its output.

The output of the NAND gate 100 is connected to the B input of a retriggerable monostable multivibrator 104, which is preferably an integrated circuit such as a type 74123, and which remains in its quasi-stable state for a predetermined time period following the last positive-going pulse applied to its B input, provided that its A input is low and its clear input C is high. The A input of the unit 104 is connected to ground, and its C input is normally high. Accordingly, the first positive-going pulse applied to the B input through the gate 100 switches it to its quasi-stable state, and subsequent pulses extend the period that the multivibrator remains in that state. The Q output of the multivibrator 104 is connected to the input of a counter 106, which is adapted to count the pulses generated by the multivibrator 104.

The line 80, which is connected to the reset inputs of all of the flip-flops 62–67, is connected to the collector of a transistor 70. The collector of the transistor 70 is also connected through a resistor 69 to a source of positive potential at a terminal 68, and the line 80 is accordingly normally high when the transistor 70 is cut off. The emitter of the transistor 70 is connected to ground, so that the voltage level on the line 80 drops to a low level when the transistor 70 is conducting. This occurs when a positive pulse is applied to a reset terminal 72, which is connected through a resistor 71 to the base of the transistor 70, rendering the transistor 70 conductive and resetting all of the flip-flops, 62–67 to the state in which the outputs 83-88 are high.

The line 80 is also connected to one input of the flip-flop 56, to reset it to the condition in which the output connected to the line 73 is high, thus enabling the gates 48–53.

When the first pulses are received at the terminals 10 and 12, the threshold of some of the amplifiers 24–30 are exceeded, causing their outputs to go high, becoming clamped to the potential at the terminal 46. When the amplifier 30, which has the lowest threshold, produces a high level at its output, the gate 99 has both of its input terminals at a high level, and accordingly produces a low level at its output, which causes the gate 100 to pass a positive-going pulse to the multivibrator 104.

If the threshold of the amplifier 29 is also exceeded, the gates 98 and 53 both produce low level outputs. The output from the gate 98 combines with that of the gate 99 to cause the gate 100 to pass a pulse to the multivibrator 104. The output from the gate 53, however, is connected to the set input of the flip-flop 67. Accordingly, the flip-flop 67 is set and the level on the output line 88 goes low, inhibiting the gate 99. In similar fashion, if the threshold of the amplifier 28 is exceeded, the flip-flop 66 is set and the gate 98 is inhibited, but the gate 96 serves to pass the pulses to the gate 100. The amplifier 28 has a higher threshold than the amplifier 29.

If the amplifier having the next higher threshold level, viz., the amplifier 27, is not actuated by the incoming pulses because the amplitude of the pulses is between the threshold levels of the amplifiers 27 and 28, the flip-flops 62–65 remain in their reset states and do not inhibit the gates to which they are connected. However, no pulses are passed by these gates except for the gate 96, because the threshold levels of the amplifiers 24–27 to which they are connected are too high to pass the incoming pulses.

At the end of the initial phase of operation, a pulse occurs on a line 74, which sets the flip-flop 56, thus inhibiting the gates 48–53. Therefore, after the initial operation, the flip-flops 62–67 remain in the condition in which they were set during the initial phase, inhibiting the gates connected to all of the amplifiers having thresholds low enough to be exceeded by pulses received during the initial phase, except for the one of such amplifiers having the highest threshold. As will be more fully described hereinafter, the initial phase of operation is terminated when nine pulses (representing the digit 9) having approximately the same amplitude are received. Each of the flip-flops 62–67 has the output from its gate 74 connected by a resistor 101 to the noninverting input of the amplifiers 24–29 by which it was set, to furnish a bias signal to the amplifier for the purpose of slightly reducing its threshold level.

The counter 106 is adapted to count one pulse each time the Q output of the multivibrator 104 changes from a high to a low level. This occurs at the end of a quasi-stable state of the multivibrator 104, which preferably has a duration of about 87 milliseconds. The Q output goes from a low to a high level when a pulse is passed by the gate 100 and the high level persists for 87 milliseconds, after which it falls again to a low level, unless the multivibrator 104 is again triggered before the end of that time. The $\overline{Q}$ output is normally high, but when a pulse is received at the input of the multivibrator 104, the $\overline{Q}$ output goes low and remains low during the interval in which the multivibrator 104 is in its quasi-stable state. The $\overline{Q}$ output of the multivibrator 104 is connected to the A input of a monostable multivibrator 108. The B and C inputs of the multivibrator 108 are connected to a positive source of potential at a terminal 110 through a pair of resistors 109 and 111, respectively.

The monostable multivibrator 108 changes its state at the same time that multivibrator 104 changes its state. The time during which the multivibrator 108 remains in its quasi-stable state, however, is somewhat longer than that of the multivibrator 104, its time period being approximately 220 milliseconds.

Both of the multivibrators 104 and 108 are of the type which may be retriggered by additional pulses which are applied thereto. Additional positive-going pulses passing through the gate 100 to the B input of the multivibrator 104 cause the multivibrator to be extended for an additional period so that its quasi-stable state is maintained until 87 milliseconds following the last pulse applied to the B input. Similarly, the period of the multivibrator 108 is also extended in response to negative-going pulses applied to its A input. If the multivibrator 104 is triggered and returns to its stable state 87 miliseconds later, and is again triggered within the succeeding 133 milliseconds, so that two negative-going pulses are received at the A input of the multivibrator 108 within 220 milliseconds, the quasi-stable state of the multivibrator 108 is extended until a time 220 milliseconds following the last negative-going pulse derived from the $\overline{Q}$ output of the multivibrator 104.

A monostable multivibrator 105 has its B input connected to the Q output of the multivibrator 104. Its A input is connected to ground, and so the multivibrator 105 is set into its quasi-stable state at the same time as the multivibrator 104. The period of the multivibrator 105 is 82 milliseconds, so that it times out 5 milliseconds before the multivibrator 104. The $\overline{Q}$ output of the multivibrator 105 is connected to one input of the gate 100, to cause the positive-going pulse produced at the output of the gate 100 to persist for 82 milliseconds. Thus, during this interval, the multivibrator 104 cannot be retriggered.

The digit-indicating pulses originating with a dial telephone handset are approximately 100 milliseconds apart. Therefore, successive pulses passed by the gate 100, which are part of a train of such pulses, each trigger the multivibrator 104 separately, but operate to extend the quasi-stable state of the multivibrator 108 until 220 milliseconds following the last pulse in the train. Therefore, the quasi-stable state of the multivibrator 108 is maintained as long as a single train of pulses is received over the transmission line and passed by the NAND gate 100. The trailing edge of each of the pulses causes the counter 106 to advance its state by one count, as a result of pulses connected from the Q output of the multivibrator 104.

Since the multivibrator 104, as well as the multivibrator 108, is extendable, the presence of a noise pulse received over the transmission line and passed by the gate 100 within 5 milliseconds of the end of its period causes the multivibrator 104 to be extended, just as if it were a separate pulse of a digit-indicating train of pulses. If the noise pulse arrives within 82 milliseconds following a legitimate pulse, the noise pulse is ignored because of the lock out action of the multivibrator 105. However, should a noise pulse be received within the last 5 milliseconds, the multivibrator 104 is extended beyond the time of arrival of the next legitimate dial pulse, and so one pulse is omitted from the pulse train passed to the counter 106 over the line 112. In this event, the counter 106 stores a count equal to one less than the number of pulses actually transmitted. The receipt of a noise pulse, therefore, does not cause the counting of pulses beyond the number of legitimate dial pulses; but, on the contrary, generally results in the counter 106 storing a number which is less than the total number of legitimate dial pulses passed by the gate 100. This fact is employed in selecting a time for the end of the set up or initial phase of operation which follows a period in which the transmission line system is reasonably noise free.

The gate 114 is connected to the first and fourth binary orders of the binary counter 106, so that it produces an output on a line 116 when both the first and fourth binary orders are high, indicating when the counter 106 has received and counted nine pulses. This signal is passed over the line 116 to the set input of the flip-flop 56, to cause the potential on the line 73 to go low, disabling the gates 43–53.

The line 73 is also connected, via a line 124, to one input of a NAND gate 126, the other input of which is connected to the $\overline{Q}$ output of the monostable multivibrator 108 by a lien 134. This output is low during the initial period of operation, and so the output of the gate 126 is high during this period.

The output of the gate 126 is connected to one input of a gate 128 over a line 130. The other input to the gate 128, over a line 132, is normally high during the initial period of operation so that, as long as the level on the line 130 is high, the output of the gate 128 is low. The output of the gate 128 is connected via a line 135 to the reset input of the counter 106. As long as the line 135 remains low, the counter 106 is free to count input pulses; but, when the line 135 goes high, the counter is reset to zero, and maintained in that state.

If the multivibrator 108 times out before the gate 114 has detected the presence of a binary 9 in the counter 106, the flip-flop 56 remains in its reset condition such that the level on the line 124 is high. The multivibrator 108 times out 220 milliseconds following the last received pulse, but the counter 106 receives its last input pulse somewhat earlier (87 milliseconds after the last pulse passed by the gate 100). Accordingly, 220 milliseconds following the last pulse passed by the gate 100, the line 134 goes high, resulting in a low output from the gate 126 on the line 130. This, in turn, causes a high output from the gate 128 on the line 134, which immediately resets the state of the counter 106 to zero.

If, however, a binary 9 is detected by operation of the gate 114 prior to the time out of the multivibrator 108, the flip-flop 56 is set before the gate 126 can pass a pulse, and the gate 126 is thereafter inhibited by a low level on the line 124. The counter 106 is, therefore, not reset at this time, but continues to hold its count of 9. The first digit received by the counter 106, as a result of counting the pulses derived from the multivibrator 104, must be a 9, or else the counter 106 is immediately reset 220 milliseconds following the last received pulse, with no controlling output signals being produced.

As described above, the presence of a noise pulse on the transmission line during the initial phase of operation may result in the counter 106 manifesting a number lower than 9. In that event, the operator at the remote location must again dial a 9. If the transmission line is still noisy, several attempts may be required to pass nine pulses before the counter 106 is able to recognize nine legitimate pulses over a relatively noise free connection. It should be appreciated that since the lowest level ones of the gates 90–99 are immediately inhibited by the first pulse which is received from the transmission line, only noise pulses having amplitudes approximately equal to that of the legitimate pulses can ordinarily interfere in a way which requires the redialing of the 9 digit. Thus, one dialing will ordinarily be sufficient to establish an end to the initial phase of operation. If a new dialing of 9 digit should be required, however, the flip-flops 62–67 which were set during the receipt of the first nine pulses are reset by a pulse produced on a line 154, by operation of a monostable multivibrator 129, by virtue of the negative-going pulse applied thereto over the line 131 from the Q output of the multivibrator 108, when the latter times out. The Q output of the multivibrator 129 goes high when the multivibrator 108 times out, and the line 154 connects this high level through a resistor 133 and a diode 135′ to the base of the transistor 70, to cause it to saturate and reset the flip-flops 62–67, as described above. The B and C inputs of the multivibrator 129 are connected to a source of positive potential by resistors 140 and 142, respectively. If a second attempt is required, therefore, due to noisy conditions in the transmission line, the second attempt can select any of the levels provided by the several gates 48–53, as described above.

When a 9 digit is recognized by the counter 106 and the gate 114, before the time out of multivibrator 108, the flip-flop 56 is set, disabling the gate 126 and the gates 48–53, preventing the setting of any further ones of the flip-flops 62–67.

The Q output of the multivibrator 108 is connected to the A input of a multivibrator 125 and the Q output of the multivibrator 125 is connected to the B input of another multivibrator 127. The B input of the multivibrator 125 and the C input of the multivibrator 127 are connected to an output 131 of the flip-flop 56, so that it carries a high level at the time the multivibrator 108 switches back to its stable state. The A input of the multivibrator 127 is connected to ground, and the C input of the multivibrator 125 is connected to a positive source of potential via a resistor 144.

When the multivibrator 108 times out, the level at its Q output falls, and the multivibrators 125, 127, and 129 are then all switched to their quasi-stable states.

The time that the multivibrator 125 remains in its quasi-stable state is 100 milliseconds. The multivibrator 127 remains in its quasi-stable state for 120 milliseconds, and the multivibrator 129 remains in its quasi-stable state for 300 milliseconds. The purpose of the two multivibrators 125 and 127 is to generate a pulse for the purpose of resetting the counter 106 after the contents of the counter 106 have been transferred to an output device, to ready it for the receipt of a subsequent digit. The multivibrator 129 accomplishes the functions of transferring the contents of the counter 106 to an output and preventing any further counting of the counter 106 during the period of about 300 milliseconds, which, together with the multivibrator 108, gives a minimum period of 520 milliseconds between pulse trains representing successive digits.

The four outputs of the binary counter 106 are connected respectively to the D inputs of four D-type flip-flops, 146–149. The outputs of the flip-flops 146–149 are connected to four inputs of a one-of-16 decoder 150, which accomplishes the function of converting a binary representation on a combination of its four input lines to a decimal representation on one of the ten output leads 152. The flip-flops 146–149 are caused to assume their set states when their D inputs are maintained at a high level at the time that a clock pulse is supplied to their C inputs. The clock pulse is derived from the Q output of the multivibrator 127 and is conveyed to the C inputs of all four flip-flops 146–149 over a line 153. The Q output of the multivibrator 127 goes high as soon as the multivibrator 127 assumes its quasi-stable state, which is at the end of the time out of the multivibrator 108. Thus, as soon as the end of a pulse train has been recognized by the time out of the multivibrator 108, the contents of the counter 106 are transferred to the flip-flops 146–149, where they are manifested as long as the clock pulse on the line 153 remains high. Meanwhile, the decoder 150 decodes the binary representation stored in the flip-flop 146-149, and furnishes a control signal on one of the ten output lines 152. The ten output lines 152 correspond to the ten possible digits which may be dialed, viz., 1 through 0.

The $\overline{Q}$ output of the multivibrator 125 is connected by a line 155 to one input of a NAND gate 156. Similarly, the Q output of the multivibrator 127 is connected by a line 157 to the other input of the gate 156. Since the multivibrator 127 has a quasi-stable period 20 milliseconds longer than that of the multivibrator 125, the outputs on the lines 155 and 157 are both high for a period of 20 milliseconds, beginning at the time out of the multivibrator 125. This occurs 100 milliseconds after the end of the digit recognized by the time out of the multivibrator 108, and there is ample time during this 100 millisecond interval for the contents of the counter 106 to be transferred to the flip-flops 146–149.

The output of the gate 156 is connected to one input of a NAND gate 158. The other input of the gate 158 is connected from the output of a NAND gate 160. The gate 160 forms, with another NAND gate 162, a flip-flop 164. Normally, the flip-flop 164 is in its state which furnishes a high level to one input of the gate 158. Accordingly, the gate 158 operates to invert the signal supplied to it from the gate 156 over a line 166. The output of the gate 158 is connected through an inverter 168 to one input of the gate 128.

The output of the inverter 168 goes low during the 20 milliseconds in which the two inputs of the gate 156 are high, because the gate 158 and the inverter 168 doubly invert the output of the gate 156. Accordingly, the low level input on the line 132 is inverted by the gate 128 (the output of the gate 126 remaining high), and a high level signal is supplied to the counter 106 over the line 135, serving to reset the counter 106. The 20 millisecond duration of the reset pulse is ample to reset the counter 106.

The $\overline{Q}$ output of the multivibrator 129 is connected by a line 170 to the clock input of the multivibrator 104. The presence of the low level signal on the line 170, during the 300 milliseconds in which the multivibrator 129 is in its quasi-stable state, inhibits operation of the multivibrator 104 so that no additional pulses can be recognized and communicated to the counter 106 during this 300 millisecond period.

The period of the multivibrator 129, together with the period of the multivibrator 108, corresponds to the mimimum interval between successive digits generated by a dial-type telephone instrument. Pulses which are received within 520 milliseconds after the end of a pulse train representing a digit are automatically rejected as noise pulses and have no effect. After 520 milliseconds, the multivibrator 129 returns to its stable state and the multivibrator 104 is again enabled to respond to pulses passed by the gate 100.

The flip-flop 164 has an input connected to its gate 162 from a terminal 171 over a line 172. When a low level pulse is applied to the terminal 171, the flip-flop 164 is placed in its reset state, and the output from the gate 160 goes low. Accordingly, the output from the gate 158 goes high, the output of the inverter 168 goes low, and the output of the gate 128 goes high, to reset the counter 106 and to maintain it in reset condition as long as the flip-flop 164 is reset. By this means, the apparatus may be disabled from operating when desired. A high level signal is connected to the terminal 171 to disable the counter 106 by resetting the flip-flop 164, provided that the Q output from the multivibrator 108 is high, as it is during the time pulses are being received and passed through the gate 100. When the Q output of the multivibrator 108 goes down, the flip-flop 164 is automatically set by a low level signal on the line 174, which interconnects the Q output of the multivibrator with an input of the gate 160, and so the counter 106 is again conditioned for operation, provided the high level signal does not persist on the terminal 171. The line 172 is connected by a resistor 173 to a source of positive potential, so that the level on the line 172 is normally high. A capacitor 175 is connected from the line 172 to ground, to delay the return of the line 172 to a high level after a disable pulse has been received at the terminal 171, to insure that the flip-flop 164 is reset by the pulse, no matter how short it may be.

The signal furnished to the terminal 72 for the purpose of resetting the flip-flop 56 prior to the beginning of the initial phase of operation preferably comes from a circuit described in the aforementioned Fish et al. application, which generates a pulse at the time that the telephone line is seized following detection of a ringing condition.

It will be appreciated from the foregoing description that the present invention is operable to set a threshold level at a time during which the transmission line is relatively noise free, and afterwards, to retain that threshold level until after the telephone line is released. A new threshold level is set during an initial period of operation at the beginning of each call, following seizing of the telephone line in response to receipt of a ringing signal.

During each communication, the threshold level is set at a value which permits the passage of all legitimate pulses originating with a dial telephone, but discriminates against noise pulses. Subsequently, each separate digit which is dialed by the dial telephone handset is recognized as a separate digit, and one of the lines 152 is energized accordingly for controlling the apparatus connected thereto (such as a dictating machine) in a predetermined manner.

The system of the present invention may advantageously be employed to control dictating machine equipment remotely, using a dial-type telephone instrument as a transmitter-receiver, with the dial of the instrument serving as the control means by which the various functions of the dictating machine may be controlled. Each of the various dictating machine functions, such as "record," "rewind," "playback," etc., is controlled by one of the 10 lines 152.

As described above, the flip-flops 62–67 are reset by a subsequent operation of the transistor 70, if a 9 digit is not detected by the end of a train of pulses, when the multivibrator 129 is triggered. When a 9 digit is recognized, however, the multivibrator 129 still produces a pulse on the line 154 when the multivibrator 108 times out. This pulse is not effective if a 9 has been detected, as the flip-flop 56 is by that time reset by a pulse over the line 74, so that the base of the transistor 70 is clamped to the low potential on the line 73 via a diode 180 connected between the line 73 and the junction of the resistor 133 and the diode 135.

A monostable multivibrator 182 is provided for furnishing a low level signal on an output line 184 and a high level signal on another output line 186, whenever pulses are being detected, as indicated by a high output from the gate 100. The output of the gate 100 is connected by a line 188 to the B input of the multivibrator 182 to cause it to trigger. The A input is grounded. When the apparatus of the present invention is employed with a dictating machine or the like, the lines 184 and 186 are preferably connected to apparatus for muting the incoming and outgoing signals, as described in the aforementioned Fish et al application.

The line 184 is also caused to go low when a signal is detected at the output of the amplifier 30, the output being connected through its coupling resistor and a line 190 through a rectifying diode 192 to an integrating circuit including a resistor 194 and a capacitor 196. The capacitor 196 is connected through a diode 198 to the base of a transistor 200, having a grounded emitter and a collector which is connected through a diode 202 to the line 184. The rectified output of the amplifier 30 charges the capacitor 196 and turns on the transistor 200, which saturates and causes the line 184 to go low. The clear input of the multivibrator 182 is connected to the line 131, to clear the multivibrator in response to operation of the flip-flop 56.

Circuit means is provided for delaying the integrating action of the capacitor 196 if a disable signal has recently been applied to the disable terminal 171. The line 172 is connected via a line 172*a* through a diode 204 and a capacitor 206 to ground. A diode 208 connects the capacitor 206 with the capacitor 196. When the line 172 goes low, the capacitor 206 is discharged, and a subsequent signal on the line 190 must charge both capacitors 196 and 206, which takes somewhat longer than if the capacitor 196 alone is charged. Eventually, if no signal is present on the line 190, the capacitor 206 is charged through the relatively large resistor 210, interconnected between the capacitor 206 and a source of positive potential.

When the apparatus of the present invention is employed for control of a dictating machine or the like, one digit, such as 2, is employed to perform a backspace operation. When a single backspace does not carry back the recording medium as far as desired, a multiple backspace function is desirable. This is accomplished by means of the monostable multivibrator 220 and its associated circuitry. The A input of the multivibrator 220 is connected to the 8 output of the decoder 150 by a line 221 and to a source of positive potential through a resistor 222. The B input is connected to a source of positive potential through a resistor 224, so the multivibrator 220 is triggered as soon as an 8 is recognized by a low potential on the line 221. The period of the multivibrator 220 is set as desired, as different dictating machines have different amounts of backspace during each discrete backspace cycle. While the multivibrator 220 is in its quasi-stable state, its $\overline{Q}$ output is low, and this output is connected to the emitter of a transistor 224', which has its collector connected by a line 225 to the 2 output line 223 of the decoder 150. The 2 output line 223 is therefore caused to go low for the period of the multivibrator 220, provided the potential on the base of the transistor 224' is higher than the level of the $\overline{Q}$ output of the multivibrator 220.

The base of the transistor 224' is connected through a resistor 226 to the line 172*b*, which is connected to the line 172, which is normally high, as long as no disable pulse is present at the terminal 171. A capacitor 228 is connected from the base of the transistor 224 and ground, and it is discharged through a diode 230 when a low level disable pulse appears, and it is charged through the resistor 226 when the disable pulse ends. This establishes a short interval during which the transistor 224' remains cut off, even if the multivibrator 220 is triggered.

The 2 output is the backspace output, and as it is maintained low for the period of the multivibrator 220, multiple backspacing functions can take place repeatedly until the multivibrator 220 times out. As described in the aforementioned Fish et al application, the multiple backspacing occurs intermittently because the system enters a review or playback mode following each backspace function, in order to search for a so-called guard tone recorded on the recording medium when the telephone line is seized following detection of a ringing condition. The intermittent operation is illustrated diagrammatically in the drawing by a buffer 229, which responds to a low level at the terminal 223 to lower the potential on the line 172, which cuts off the transistor 224, thus providing for repetitive pulsing of the terminal 223 throughout the period of the multivibrator 220. When such a guard tone is detected, a low level appears on a line 227, which is connected to the clear input C of the multivibrator 220, so that it is immediately returned to its stable state and the multiple backspacing is terminated. If no guard tone is detected, however, the aforesaid relay is deactuated, whereupon the 2 line 223 is recognized as low and another backspace operation is performed.

The voltage divider incorporating the resistors 34-41 is preferably constructed with the resistors 36–40 having relatively low values, so that the discrimination among signal levels is greatest for low level signals. The values of the resistor 35 is somewhat higher, to set the threshold of the amplifier 24 well above the threshold of the amplifier 25, for high level signals. The resistor 41 is chosen in accordance with the lowest level pulses which are to be accepted, and is preferably on the order of three times the value of the resistors 36–40. In one embodiment, the potential applied to the terminal 32 is −12 volts, the resistor 34 is 6.8 k ohms, 35 is 3.4 k ohms, 36–40 are each 150 ohms, and 41 is 470 ohms.

In use, neither Touch Tone signals nor voice signals cause the false recognition of dial pulses, because both cause the monostable multivibrator 104 to retrigger, thus preventing operation of the counter 106. It should be also noted that the system of the present invention is totally insensitive to the waveshape of the dial pulses, but only to the repetition rate of the pulses. Typically, pulses are produced during both make and break operations of the dial, producing two sets of pulses. Only one set is used in the present invention, however, because of the spacing of the pulses of the two sets relative to each other.

In one embodiment of the present invention, all of the monostable multivibrators are type 74123 units, and the gates, flip-flops, and inverters are also 7400 series logic, the counter 106 being a type 7493 unit, the D-type flip-flops 146–149 being 7475 units, and the decoder 150 being a 7445 unit.

The present invention may also be employed in a telephone system for detecting and responsing to the pulses generated by dialtype telephone instruments, for establishing telephone circuits. By this means, the supervisory limits may be greatly extended with respect to such instruments by the present invention, and it is not necessary that the central telephone office, at which such telephone circuits are established, be located physically close to the telephone instruments which it serves.

The pulses which are detected and counted by the present invention are quite variable in form, ranging from pulses which are substantially d.c. pulses from nearby dial-type telephone instruments to modulated envelopes of audio frequency oscillations. As the pulses are frequently differentiated before reaching the detector of the present invention, a spike is produced in response to each making of the contacts within the dial-type instrument, and another (opposite polarity) spike is produced in response to each breaking of these contacts. If these spikes then pass over a long transmission line, they lose their spike character and resemble a packet of oscillations, and are spread out in time due to the characteristics of the telephone transmission line. The apparatus of the present invention, however, is able to detect any of the various forms the dial pulses may take with equal facility and precision. If desired, the present invention may be used in conjunction with a filter which functions to transform all of the pulses into a uniform style or shape, but this is not necessary to its proper functioning.

The present invention automatically selects either the making spikes or the breaking spikes, whichever is higher in amplitude, and the other set of spikes is automatically locked out by operation of the monostable multivibrators. The threshold level is set by the first spike which is received, whether in response to a make or to a break operation, and the monostable multivibrators inhibit response to the following make spike (if the first received spike was a break spike) and vice versa. Even though response to the following spike is inhibited, however, the threshold setting may be increased if the following spike is greater in amplitude, so that after the inhibiting multivibrator times out, the succeeding spike is ignored if its amplitude is insufficient to exceed the new threshold, and the apparatus becomes responsive to the other set of spikes. This adaptability to change the series of spikes to which the apparatus is responsive always makes use of the series which has the greatest amplitude, thus maximizing the signal-to-noise ratio.

Although the present invention has been described in terms of a digital threshold setting device having a plurality of discrete steps, it will be obvious to those skilled in the art that an analog device may be employed instead, so that the threshold is set by a peak detector or by a sample and hold device responsive to the peak amplitude of the received pulses, with a predetermined positive feedback or hysteresis being employed as described above to lower the threshold a predetermined amount below the peak level.

In addition, it will be obvious to those skilled in the art that the variable threshold circuit is not necessary when the apparatus is to be used under closely controlled conditions, such as with a leased telephone line which has constant characteristics so that the pulse amplitude does not vary, or with local lines which have relatively strong and easily detected pulse signals.

Other modifications and additions will be apparent to those skilled in the art, without departing from the essential features of novelty of the invention, which are intended to be defined and secured by the appended claims.

What is claimed is:

1. For use with a remote control device for controlling electrically operated apparatus, using a telephone transmission line interconnected between said electrically operated apparatus and a dial-type telephone instrument, said transmission line constituting an a.c. coupling between said device and said instrument while isolating the d.c. potential of said transmission line at said instrument from said device, the combination comprising: detecting means including means for establishing a series of different discrete threshold levels and a plurality of detector means, one for each said discrete level, for separately detecting on said transmission line the presence of dial pulses generated by a dial-type telephone instrument exceeding any of said discrete levels, in response to an instantaneous potential on said line of greater than a discrete level, counting means for counting the number of said pulses within a train of said pulses, output means for manifesting one of a plurality of output signals in response to the number of pulses in said train, and means connected to said output means and responsive to one of said output signals for disabling the detector means for the discrete levels below the highest discrete level which was exceeded during the counted train of pulses.

2. Apparatus according to claim 1, wherein said detecting means includes means for establishing a predetermined number of levels corresponding to discrete potential levels of pulses on said transmission line, and means for selecting one such level for establishing a minimum threshold below which signals are rejected as spurious signals and above which signals are recognized as dial pulses.

3. Apparatus according to claim 2, including selecting means for establishing a preliminary period of operation, and means operative during said preliminary period for selecting one of said discrete levels for establishing said threshold level for rejecting spurious signals following said preliminary period.

4. For use with a remote control device for controlling electrically operated apparatus, using a telephone transmission line interconnected between said electrically operated apparatus and a dial-type telephone instrument, said transmission line constituting an a.c. coupling between said device and said instrument while isolating the d.c. potential of said transmission line at said instrument from said device, the combination comprising: detecting means for detecting on said transmission line the presence of dial pulses generated by a dial-type telephone instrument, in response to an instantaneous potential on said line of greater than a variable predetermined level, counting means for counting the number of said pulses within a train of said pulses, output means for manifesting one of a plurality of output signals in response to the number of pulses in said train, said detecting means including means for establishing a predetermined number of levels corresponding to discrete potential levels of pulses on said transmission line, means for selecting one such level for establishing a minimum threshold below which signals are rejected as spurious signals and above which signals are recognized as dial pulses, selecting means for establishing a preliminary period of operation, means operative during said preliminary period for selecting one of said discrete levels for establishing said threshold level for rejecting spurious signals following said preliminary period, said selecting means comprising a plurality of amplifiers, and biasing means for biasing each of said amplifiers at a different level, whereby each of said amplifiers produces an output signal only when an input signal applied thereto from said transmission line exceeds its respective level, a plurality of gate disabling flip-flops, and gate means interconnected between individual ones of said amplifiers and individual ones of said flip-flops for setting said flip-flops in response to the appearance of signals at the outputs of their respective amplifiers, and connecting means for interconnecting said flip-flops with certain ones of said gates for disabling selected ones of said gates during said preliminary period.

5. Apparatus according to claim 4, including a control flip-flop, means for connecting an output of said control flip-flop to a common input of all of said gate disabling flip-flops, for resetting all of said gate disabling flip-flops at the beginning of said preliminary period, and means responsive to the detection and recognition of a predetermined number of pulses in one of said pulse trains for resetting said control flip-flop for signalling the end of said preliminary period and for preventing further setting of said gate disabling flip-flops.

6. For use with a remote control device for controlling electrically operated apparatus by employing a dial-type telephone instrument connected with said remote control device over a telephone transmission line, the combination comprising; detecting means for detecting a train of dial pulses generated by said instrument on said transmission line, counting means for counting said pulses to manifest the number of pulses in said train, and output means connected to said counting means for energizing one of a plurality of output signals in response to said number, said detecting means including sensing means for detecting a pulse by developing a control signal whenever the potential on said transmission line exceeds a predetermined variable threshold value, and control means connected to said sensing means for inhibiting subsequent operation of said sensing means for a predetermined first time interval, said sensing means being operative to produce an output pulse if no subsequent pulse is detected by said sensing means during a second interval following said first interval, and responsive to the presence of a subsequent pulse within said second time interval for inhibiting the production of said output pulse, said counting means comprising a counter connected with said sensing means for receiving said output pulse and for counting all of such output pulses.

7. Apparatus according to claim 6, including end detecting means for detecting the end of said pulse train, said end detecting means being responsive to the passage of a predetermined third time interval following one of said output pulses for developing an end signal.

8. Apparatus according to claim 7, wherein said end detecting means comprises a retriggerable monostable multivibrator, said multivibrator having a period in excess of the interval between successive pulses in a pulse train generated by operation of a dial-type telephone instrument, whereby said multivibrator is retriggered by each of said output pulses produced in response to the pulses of said pulse train, said multivibrator returning to its stable state at the end of said pulse train, said end signal being developed by said multivibrator when it returns to its stable state.

9. Apparatus according to claim 6, including storage means for storing the state of said counter at the end of said pulse train, and means for clearing said counter preparatory to the receipt of a subsequent pulse train.

10. Apparatus according to claim 9, including means responsive to the detection of the end of said pulse train for developing first and second control pulses, means connecting said first control pulse to said storage means for actuating said storage means for storing the state of said counter at the time of said first control pulse, and means connecting said second control pulse to said counter for resetting said counter.

11. In apparatus for use in conjunction with a remote control device for controlling electrically operated apparatus over a telephone transmission line by use of a dial-type telephone instrument, the combination comprising detector means for detecting dial pulses transmitted over said transmission line, output means responsive to said detector means for manifesting one of a plurality of output signals in response to the number of pulses transmitted in a single pulse train over said transmission line, said plurality of output signals being adapted to be connected to said electrically operated apparatus for controlling said apparatus in response to the pulses transmitted over said transmission line, a terminal adapted to receive a signal from an external decoder whenever a touch tone signal is being detected on said transmission line, and means for connecting said terminal with said detector, said connecting means including a bistable device, means connecting an input of said bistable device with said terminal decoder to set said bistable device to one state in response to detection of a signal at said terminal, and means connecting said bistable device with said detector for disabling said detector in response to setting of said bistable device.

12. Apparatus according to claim 11, wherein said detector includes a counter for manifesting the number of pulses in a pulse train, means for connecting said bistable device with said counter for maintaining said counter in its reset condition, and means responsive to the end of said touch tone signal for resetting said bistable device to its other state.

13. Apparatus according to claim 1, including means responsive to the frequency components of signals on said transmission line representative of an operator's voice or of touch tone signals present on said line for inhibiting the operation of said detecting means.

14. For use with a remote control device for controlling electrically operated apparatus, using a telephone transmission line interconnected between said electrically operated apparatus and a dial-type telephone instrument, said transmission line constituting an a.c. coupling between said device and said instrument while isolating the d.c. potential of said transmission line at said instrument from said device, the combination comprising: detecting means for detecting on said transmission line the presence of dial pulses generated by a dialtype telephone instrument, in response to an instantaneous potential on said line of greater than a variable predetermined level, counting means for counting the number of said pulses within a train of said pulses, output means for manifesting one of a plurality of output signals in response to the number of pulses in said train, said detecting means comprising a plurality of amplifiers connected with said transmission line, said amplifiers having individual threshold levels, means operative in response to signals appearing at the outputs of individual ones of said amplifiers for disabling amplifiers having lower threshold levels, and means connected with each of said amplifiers for lowering its threshold by a predetermined amount subsequent to a signal appearing at its output.

15. For use with a remote control device for controlling electrically operated apparatus, using a telephone transmission line interconnected between said electrically operated apparatus and a dial-type telephone instrument, said transmission line constituting an a.c. coupling between said device and said instrument while isolating the d.c. potential of said transmission line at said instrument from said device, the combination comprising: detecting means for detecting on said transmission line the presence of dial pulses generated by a dial-type telephone instrument, in response to an instantaneous potential on said line of greater than a variable predetermined level, counting means for counting the number of said pulses within a train of said pulses, output means for manifesting one of a plurality of output signals in response to the number of pulses in said train, a monostable multivibrator connected to a first of said plurality of outputs for operation in response to detection of a pulse train having a first predetermined number of pulses, and means connecting an output of said monostable multivibrator to a second of said plurality of outputs, whereby detection of a pulse train having said first predetermined number of pulses causes energization of said second output for the period of said multivibrator.

16. Apparatus according to claim 15, including means connecting a clear input of said monostable multivibrator with a terminal adapted to be connected to a touch tone decoder and means connecting said second output to a terminal adapted to be connected to control a multiple backspace function of a dictating machine, whereby said multiple backspace function is repeated for the period of said monostable multivibrator, in response to detection of a pulse train having said first predetermined number of pulses, unless said monostable multivibrator is first reset by a signal from said touch tone decoder.

17. A method for remotely controlling electrically operated apparatus employing a dial-type telephone instrument and an a.c. coupled transmission line incorporating means for isolating the d.c. potential at one end of said line from the other end of said line, comprising the steps of: interconnecting one end of said transmission line with said telephone instrument and detecting pulses at the other end of said transmission line in response to the instantaneous amplitude of a signal present on said line exceeding any of a plurality of previously established discrete threshold levels, manifesting which of said discrete levels are exceeded during a preliminary period of operation, establishing the highest discrete level which was exceeded during said preliminary period as a threshold for subsequent pulses ignoring pulses subsequent to said preliminary period which are less than said highest discrete level which was exceeded during said preliminary period, counting the number of pulses in a train of said pulses which occur within a predetermined range of interpulse spacing, said preliminary period ending when a pulse train having a predetermined number of pulses is detected, and energizing one of a plurality of output lines adapted to be connected with said electrically operated apparatus for controlling the same in response to the number of pulses in each subsequent pulse train.

18. The method according to claim 17, including the step of providing a plurality of discrete levels below which signals on said transmission line are rejected as noise and above which signals are recognized as pulses produced by a dial-type instrument, and selecting one of said discrete levels during a preliminary period.

19. A method for remotely controlling electrically operated apparatus employing a dial-type telephone instrument and an a.c. coupled transmission line incorporating means for isolating the d.c. potential at one end of said line from the other end of said line, comprising the steps of: interconnecting one end of said transmission line with said telephone instrument and detecting pulses at the other end of said transmission line in response to the instantaneous amplitude of a signal present on said line exceeding a predetermined adjustable threshold, counting the number of pulses in a train of said pulses which occur within a predetermined range of inter-pulse spacing, energizing one of a plurality of output lines adapted to be connected with said electrically operated apparatus for controlling the same in response to which one of said output lines is energized, providing a plurality of discrete levels below which signals on said transmission line are rejected as noise and above which signals are recognized as pulses produced by a dial-type instrument, selecting one of said discrete levels during a preliminary period as a threshold for subsequently received pulses by detecting the highest discrete level exceeded by said of pulses received during said preliminary period, and maintaining said selected level as a threshold during detection of pulses after said preliminary period.

20. The method according to claim 19, including the step of recognizing the end of a train of pulses having a predetermined number of pulses, and thereafter rejecting pulses having amplitudes below said predetermined level, irrespective of the maximum amplitude of pulses detected following said train.

21. The method according to claim 20, including the steps of developing a first signal in response to the recognition of the end of a train of pulses having said predetermined number of pulses, and developing a second signal in response to the recognition of the end of a train of pulses having fewer than said predetermined number of pulses, and using said second signal for extending said preliminary period.

22. The method according to claim 21, including the steps of rejecting pulses received during said preliminary period subsequent to the detection of a pulse having a greater amplitude than said rejected pulses, and reinitiating said preliminary period in response to said second signal, whereby pulses are not rejected until after the detection of pulses having greater amplitudes.

23. A method for remotely controlling electrically operated apparatus employing a dial-type telephone instrument and an a.c. coupled transmission line incorporating means for isolating the d.c. potential at one end of said line from the other end of said line, comprising the steps of: interconnecting one end of said transmission line with said telephone instrument and detecting pulses at the other end of said transmission line in response to the instantaneous amplitude of a signal present on said line exceeding a predetermined adjustable threshold, counting the number of pulses in a train of said pulses which occur within a predetermined range of inter-pulse spacing, energizing one of a plurality of output lines adapted to be connected with said electrically operated apparatus for controlling the same in response to which one of said output lines is energized, providing a plurality of differential amplifiers each having one input connected with said transmission line, and another input connected with a source of individual bias potential for establishing individual input threshold levels for each said amplifiers, connecting the outputs of each of said amplifiers with a respective bistable device adapted to be set to a first state when an output has been received from its respective amplifier during a preliminary pulse train sequence on said transmission line following resetting thereof, resetting all of said bistable devices, and selecting one of said differential amplifiers to establish a threshold level for detection of subsequent pulses on said transmission line in response to the setting of said bistable devices during said preliminary pulse train sequence.

* * * * *